No. 873,639.
PATENTED DEC. 10, 1907.
J. A. VINCENT.
MOUSE TRAP.
APPLICATION FILED FEB. 18, 1907.
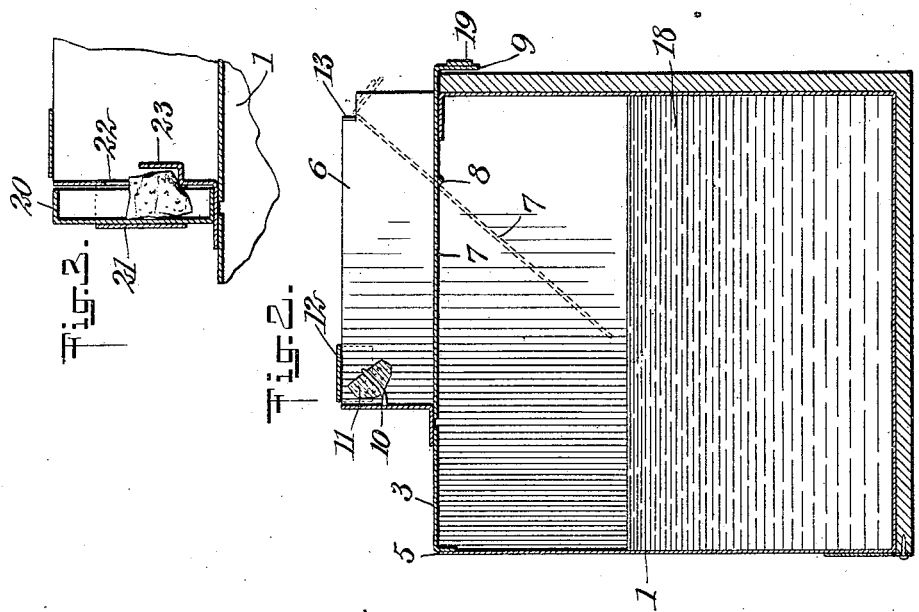
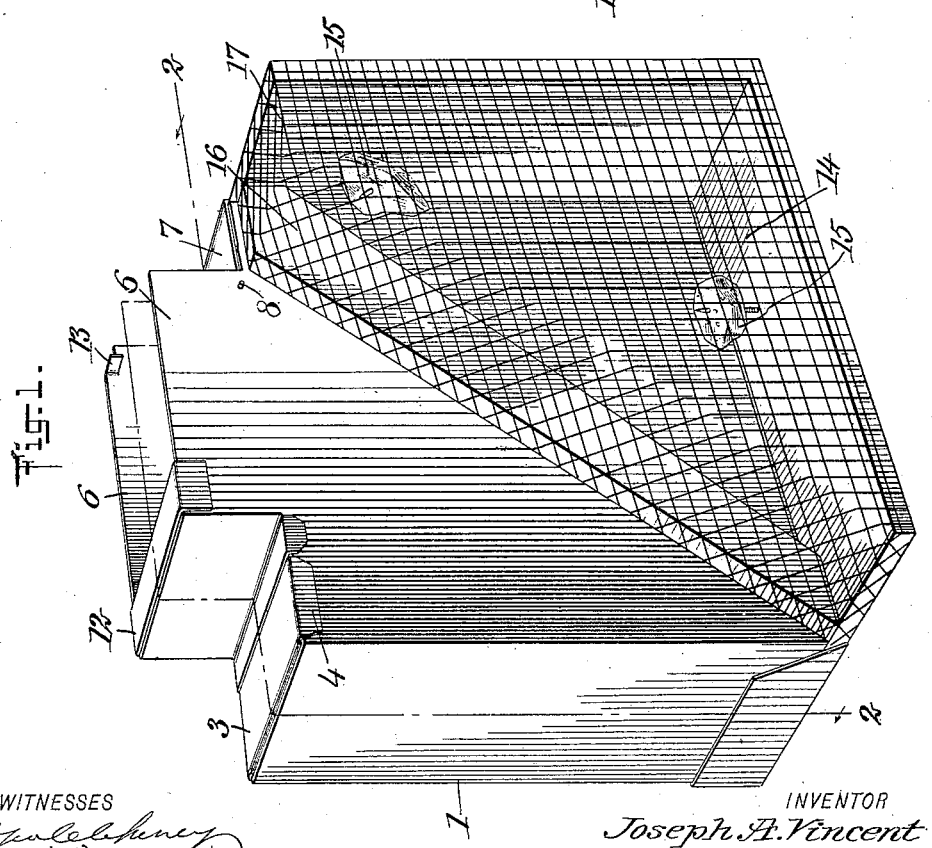
WITNESSES
INVENTOR
Joseph A. Vincent
BY
ATTORNEYS

UNITED STATES PATENT OFFICE.

JOSEPH A. VINCENT, OF HASTINGS-UPON-HUDSON, NEW YORK, ASSIGNOR OF ONE-HALF TO WILLIAM C. KOSTER, OF HASTINGS-UPON-HUDSON, NEW YORK.

MOUSE-TRAP.

No. 873,639.   Specification of Letters Patent.   Patented Dec. 10, 1907.

Application filed February 18, 1907. Serial No. 357,871.

*To all whom it may concern:*

Be it known that I, JOSEPH A. VINCENT, a citizen of the United States, and a resident of Hastings-upon-Hudson, in the county of Westchester and State of New York, have invented a new and Improved Mouse-Trap, of which the following is a full, clear, and exact description.

This invention has for its object to provide a mouse trap, simple in construction, effective in operation and durable in use. Such objects I accomplish by the means illustrated in the accompanying drawings, in which Figure 1 is a perspective view of a device embodying my invention; Fig. 2 is a vertical transverse section taken on the line 2—2 of Fig. 1; and Fig. 3 is a vertical section of a modification of the bait holder.

As illustrated in the drawings, 1 represents a main receptacle adapted to hold water and provided on its upper portion with a detachable cover 3, having end flanges 4 and a side flange 5, adapted thereby to secure it to the walls of the main chamber. The side walls of the main chamber are preferably projected at their upper portion 6, to form an entrance chamber. Within the entrance chamber, a trap-door 7 is pivotally mounted on the upper portion of the receptacle by means of a hinge-pin 8, which is secured at its ends to the side walls of the main receptacle. The outer end 9 of said door is preferably offset, as shown at 9 in Fig. 2.

A bait receptacle is arranged at the back of the entrance chamber and consists preferably of a hook 10, secured to the end wall of said chamber and adapted to hold bait 11 when attached thereto.

A transverse plate 12 extends across the top of the entrance chamber, serving as a hood to prevent the bait from being reached from the rear portion of the entrance chamber. A stop 13 is formed on the forward end of the entrance chamber, to limit the upward movement of the outer end of the trap-door 7.

An auxiliary receptacle is attached to the main receptacle, designed to hold the bait, and is provided with foraminated walls 14 thereby enabling the bait 15 to be exposed while held within said receptacle. One of the walls of the auxiliary chamber is preferably inclined, forming a lead-way 16 extending from the floor to a landing 17 which is adjacent to the forward end of the trap-door 7 and to the forward end of the entrance chamber. By means of such construction the bait is fully exposed so as to attract the mice, and is at the same time protected, thereby enabling the bait to last for a considerable time, keeping the trap continuously set.

The mice are attracted by the bait in the auxiliary chamber and in their effort to reach said bait are attracted to the upper portion of the bait chamber where they will find the bait 11 attached to the hook 10 at the rear end of the entrance chamber. The mice, on making an effort to reach this bait, move along the trap-door, and as they pass beyond the hinge-pin 8 the inner end of the door drops, dumping the mice into the water 18 contained within the receptacle. The trap-door 7 immediately resumes its former horizontal position, the outer end of the door being provided with a weight 19 which balances the trap-door evenly. The contents of the receptacle may be emptied when desired, by removing the detachable cover 3 from the upper portion of the receptacle, and the receptacle may be refilled with water in the same manner when desired.

The means for holding the bait at the back of the entrance chamber may be modified if desired, without departing from my invention; thus, instead of the hook 10, a box 20 having a closed back and side portions and an open front may be held by means of a band 21, against the rear end of the entrance chamber which is provided with an aperture 22 adapted to enable the bait to project from said box into the rear end of the entrance chamber, and to be held in place by means of a transverse shelf 23 off-set from the rear wall of the entrance chamber. Other means having similar capabilities may be used without departing from the spirit of my invention.

What I claim as new and desire to secure by Letters Patent is:

1. The combination with a closed rectangular receptacle having its sides extended at their upper central portion to form an entrance chamber, and provided with a discharge aperture at the rear of said side extension and a landing at the front of said extension, a trap door pivoted in the entrance chamber, and a bait chamber having foraminated walls, one of which is inclined to serve as a run-way, and a landing adjacent to said run-way and the landing of said receptacle, substantially as shown and described.

2. The combination with a closed rectangular receptacle having its sides extended at their upper central portion to form an entrance chamber, and provided with a discharge aperture and a landing at the front of said extension, a trap-door pivoted in the entrance chamber, and a bait chamber having foraminated walls one of which is inclined to serve as a run-way, and a landing adjacent to said run-way and the landing of said receptacle, substantially as shown and described.

In testimony whereof I have signed my name to this specification in the presence of two subscribing witnesses.

JOSEPH A. VINCENT.

Witnesses:
 ROBERT W. HARDIE,
 JNO. M. RITTER.